US006247327B1

(12) United States Patent
An et al.

(10) Patent No.: US 6,247,327 B1
(45) Date of Patent: Jun. 19, 2001

(54) EVAPORATIVE COOLER

(75) Inventors: Jae S. An, Coon Rapids; Robert L. Linstroth, Marine on St. Croix, both of MN (US)

(73) Assignee: Modine Manufacturing Company, Racine, WI (US)

( * ) Notice: Subject to any disclaimer, the term of this patent is extended or adjusted under 35 U.S.C. 154(b) by 0 days.

(21) Appl. No.: 09/442,929

(22) Filed: Nov. 18, 1999

(51) Int. Cl.[7] ........................................... F28D 5/00
(52) U.S. Cl. ................................... 62/314; 62/310
(58) Field of Search ........................... 62/310, 314

(56) References Cited

U.S. PATENT DOCUMENTS

| | | | |
|---|---|---|---|
| 4,135,370 | * | 1/1979 | Hosoda et al. .................... 62/274 |
| 4,312,819 | * | 1/1982 | Leyland ............................ 261/152 |
| 4,379,712 | * | 4/1983 | Sperr, Jr. et al. ................. 55/257 |
| 4,977,756 | * | 12/1990 | Brock ................................ 62/314 |
| 5,349,829 | * | 9/1994 | Tsimerman ........................ 62/314 |
| 5,857,350 | * | 1/1999 | Johnson et al. ................... 62/314 |
| 5,956,964 | * | 9/1999 | Wright ............................... 62/304 |

* cited by examiner

Primary Examiner—William Doerrler
Assistant Examiner—Mark Shulman
(74) Attorney, Agent, or Firm—Wood, Phillips, VanSanten, Clark & Mortimer

(57) ABSTRACT

The effectiveness of an evaporative cooler is increased in a construction having a housing (10) provided with an air entrance (18) and an air exit (20) together with a substantially closed air flow path (32) extending between the entrance (18) and the exit (20). A body (34) of evaporative cooling media is within the housing (10) and extends across the air path (32). The body has an upper end (39) and upstream and downstream sides (46), (38). A water distribution plate (54) is located above the body (34) and has an elongated edge (60) which contacts the body (34) along the entire length of the edge (60) at a location at or closely adjacent the upstream side (46). A spring (78) biases the edge (60) against the body (34) and a water distribution header (64) overlies the water distribution plate (54) and directs water onto the plate (54) as a plurality of merging streams.

12 Claims, 3 Drawing Sheets

EVAPORATIVE COOLER

FIELD OF THE INVENTION

This invention relates to evaporative coolers, and more particularly, to a high efficiency evaporative cooler that may be readily serviced.

BACKGROUND OF THE INVENTION

Evaporative coolers are frequently utilized as parts of air conditioning systems in a relatively dry environment where a substantial differential exists between the wet bulb temperature and the dry bulb temperature of the air to be cooled. In operation, the relatively dry air to be cooled is placed in contact with water which evaporates into the dry air. As the water evaporates, it takes up the latent heat of evaporation from its surroundings, including the air, thereby cooling the same.

In the usual case, an evaporative cooling media is utilized. Water is trickled across the media while air is passed therethrough to promote good contact between the air and the water to provide the desired cooling effect. The air is typically propelled through the media by means of a fan or the like which may be either upstream or downstream of the media. In either event, care must be taken so that the velocity of air through the media is not so high as to entrain water in the liquid phase and introduce it into the space to be cooled along with the cool air. At the same time, higher velocities are often desirable as they enable the use of a lesser volume of evaporative media, allowing cooler size to be reduced. In any event, as a consequence, manufacturers of evaporative cooling media, in their specifications for their product, typically specify a maximum permitted air velocity as well as an effectiveness at a given velocity. Effectiveness is defined by the temperature difference between the temperature of the air stream entering the cooler and the temperature of the air stream exiting the cooler divided by the difference between the wet and dry bulb temperatures of the entering air and multiplied by 100.

In typical, commercially available direct evaporative cooling media today, air velocities are limited to a range of 700 feet per minute or less, because the employment of higher air velocities would possibly result in undesirable carry-over of liquid water in the air stream. Consequently, there is a need for an evaporative cooler that can achieve greater air velocities without creating a carry-over problem, or without reducing the evaporative cooler's effectiveness while being more compact in size.

At the same time, those skilled in the art will recognize that evaporative cooling media must be changed from time to time. Because water is evaporating from the surface of the media, any mineral content within the water will be left as a residue on the cooling media when the water evaporates. Over the passage of time, the build-up of mineral on the media will cause increasing fouling of the media and an accompanying drop in effectiveness.

Thus, it is standard practice to, at periodic intervals, change the evaporative cooling media in evaporative coolers before mineral build-up on the media becomes so great as to bring about inefficiencies in operation. Since, in the usual case, the media is contained in a housing, access must be achieved to the housing to remove and replace the media. This is not always an easily accomplished task because the media typically will be disposed between a water collection system that collects excess water that has not been evaporated in the media and a water distribution system which distributes water to the media for evaporation thereon. As a result, there is also a real need for a readily serviceable evaporative cooler.

The present invention is directed to providing one, or the other, or both of the foregoing needs.

SUMMARY OF THE INVENTION

It is the principal object of the invention to provide a new and improved evaporative cooler. More particularly, it is an object of the invention to provide an evaporative cooler with improved efficiency at higher air throughput velocities without incurring canyover of liquid water in the air stream, and/or improved ease of servicing.

According to one facet of the invention, a highly efficient evaporative cooler is provided. The same includes a housing having an air entrance, an air exit and a substantially closed air flow path extending between the entrance and the exit. A body of evaporative cooling media is disposed within the housing and extends entirely across the air path. The body has an upper end and upstream and downstream sides in the direction of air flow between the entrance and the exit. A water distribution plate is located above the body and has an elongated edge contacting the body along the entire length of the edge at a location at or closely adjacent to the upstream side. A spring biases the edge against the body and a water distribution header overlies the water distribution plate and directs water onto the plate as a plurality of streams.

According to this facet of the invention, effectiveness may be improved by directing relatively high velocity air through the media without generating water carry-over.

A preferred embodiment contemplates that the header include a plurality of spaced water outlet ports directed toward the plate to generate the water streams. The streams merge with one another on the plate to provide a nominally uniform sheet of water on the plate at the edge in contact with the media.

Preferably, the header is mounted to the distribution plate and the spring engages the header.

In one embodiment, the distribution plate is hinged about an axis generally parallel to the edge and spaced therefrom.

Preferably, the edge is directed toward the upstream side of the media.

In one embodiment, the water distribution plate mounts the water distribution header and includes spaced, slotted, mounting elements spaced from the edge of the water distribution plate and at least one pivot pin defining a pivot axis spaced from the edge of the plate is provided to removably receive the slotted mounting elements to pivotally and removably mount the water distribution plate and the header within the housing.

This facet of the invention provides a highly efficient evaporative cooler with improved effectiveness, and/or ease of service.

According to another facet of the invention, an evaporative cooler is provided which includes a housing having an air entrance and an opposite air exit. A lower, water collecting basin extends across and within the housing between the entrance and the exit. An upper, back cover plate is located within the housing and extends toward the basin. Also included is an upper front cover plate within the housing which also extends toward the basin and which is spaced from the back cover plate in the direction of the air inlet. A media support is located within the housing just above the basin and is adapted to support a body of evaporative cooling media within the housing with an upper end of the body disposed between and engaging the cover plates. A rod or pivot pins are disposed between the cover plates and define a generally horizontal pivot axis across the interior of the housing. A water distribution plate is located between the cover plates and to an inlet side of the pivot axis. A water distribution header is secured to the water distribution plate. Mounting elements having open slots are secured to the water distribution plate and the slots removably receive the rod or the pivot pins. At least one spring is mounted on the front cover plate and engages one of the header and the water distribution plate to urge the water distribution plate into engagement with a body of evaporative cooling media on the support.

According to this facet of the invention, the water distribution plate and header are removed as a unitary structure allowing ready access to and removability of an evaporative cooling media disposed on the support therefor.

In a preferred embodiment, the water distribution plate has an edge facing the inlet and engaging the media body. The edge is closely adjacent the front cover plate and the pivot axis is between the edge of the distribution plate and the back cover plate.

Preferably, the spring is a leaf spring and has an extended flat surface for engaging said one of the header and the water distribution plate.

In a highly preferred embodiment, the housing includes a plurality of mounting devices for mounting one of the cover plates at any one of a series of desired locations within the housing.

Preferably, the media support is formed of two telescoping apertured or slotted elements so as to be adjustable to receive media of varying dimensions as measured in the direction between the entrance and the outlet.

A highly preferred embodiment contemplates that the water distribution plate be an inverted, V-shaped plate having an upstream leg and a downstream leg. The upstream leg terminates in an edge closely adjacent the front cover plate and both of the legs have tabs at each end. The tabs on the upstream leg mount the header while the tabs in the downstream leg constitute the mounting elements.

Other objects and advantages will become apparent from the following specification taken in connection with the accompanying drawings.

DESCRIPTION OF THE PREFERRED EMBODIMENTS

Figure 1:
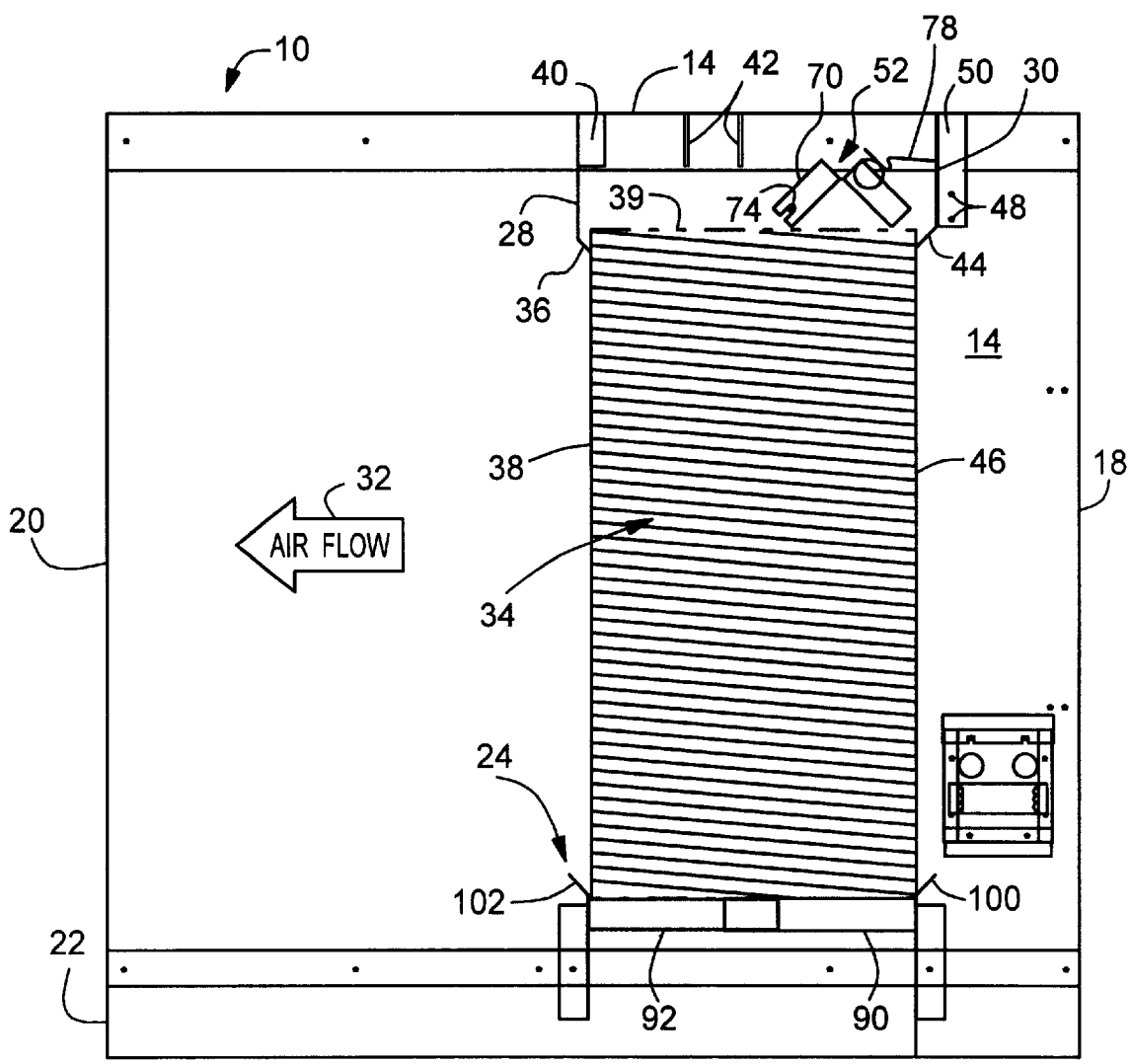
FIG. 1 is a somewhat schematic, vertical sectional view of an evaporative cooler made according to the invention.
Figure 2:
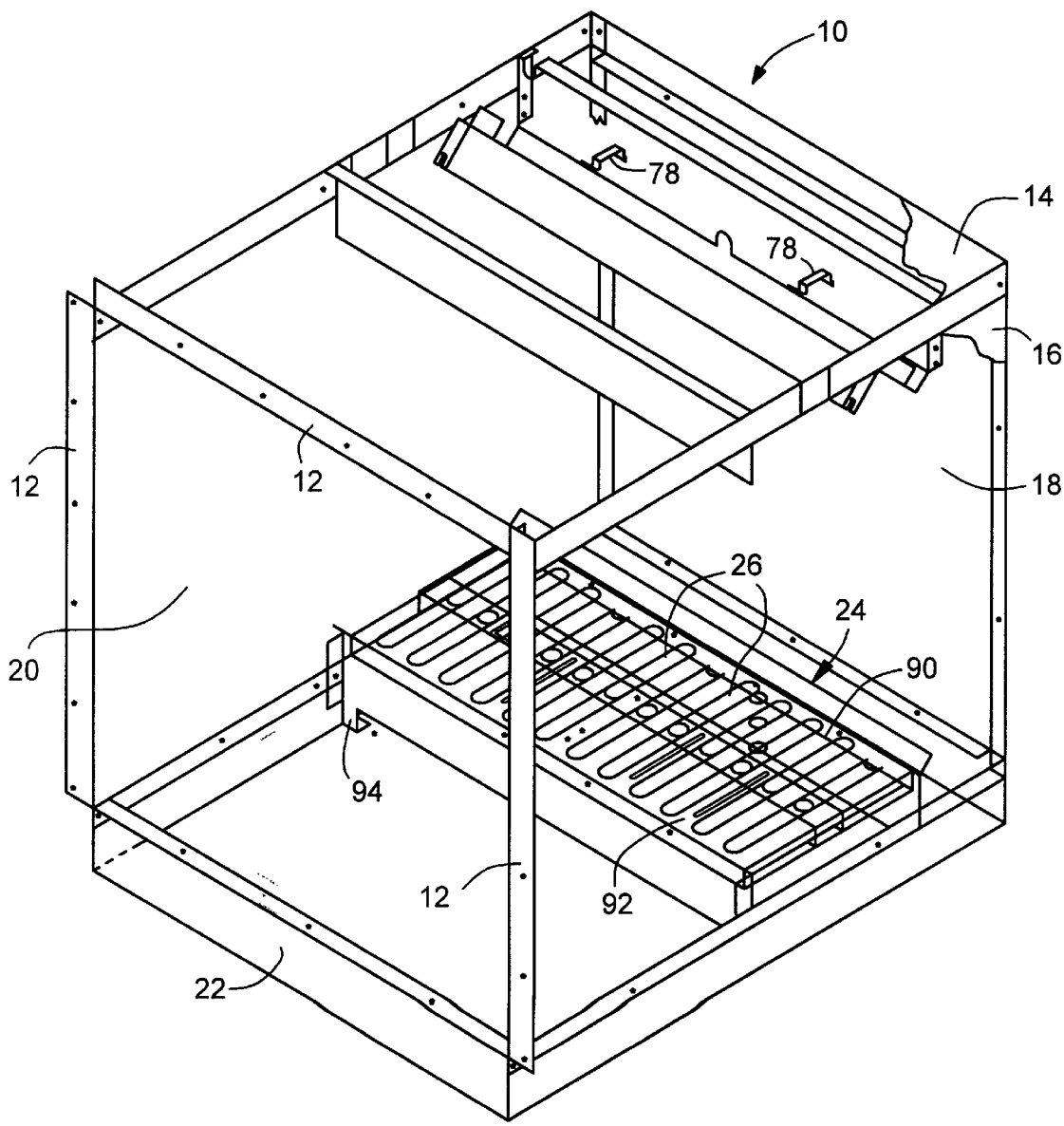
FIG. 2 is a perspective view of the evaporative cooler with parts removed and/or broken away for clarity.

An exemplary embodiment of an evaporative cooler made according to the invention is illustrated in the drawings and with reference to FIGS. 1 and 2, is seen to include a housing, generally designated in the form of a rectangular solid. As seen in FIG. 2, the housing 10 is made up of a plurality of preformed panels such as a top cover panel 14 and side cover panels. The side and top cover panels, 14 include mounting flanges 12 by which the evaporative cooler is attached to other mechanical equipment.

The housing 10 includes an open front 18 and an open rear 20 which respectively serve as an air entrance and as an air exit. Media protective screens and/or pre and post air filters (not shown), may cover one or the other or both.

A rectangular shaped pan 22 defines the bottom of the housing 10 and serves as a basin for water that is passed through the evaporator during operation but which is not actually evaporated therein. As is conventional, a pump and suitable valving (not shown) will be associated with the basin 22 to recirculate the water according to conventional flow control parameters.

Still referring to FIGS. 1 and 2, within the basin 22 is a media support structure, generally designated 24. The same has grooves or perforations 26 in its upper surface to allow water to drain through the support surface to the basin 22. The actual structure of the support surface 24 will be described in greater detail hereinafter.

Adjacent the top panel 14 of the housing 10, the evaporator includes a rear cover panel or plate 28 and a front cover panel or plate 30. The two are spaced from one another a distance equal to the depth, in the direction of air flow 32, of a body of evaporative cooling media 34. The body 34 may be of any known cooling media material as, for example, cooling media available from Munters Evaporative Cooling Division of Fort Meyers, Fla. The rear cover plate 28 includes an inturned, lower edge 36 which engages the body 34 on its downstream side 38 adjacent the top 39 of the body 34. The plate 28 also includes locating ears 40 (only one of which is shown) which may be received in any one of three slots 42 (only two of which are shown). The provision of the three slots 42 allows the location of the rear cover plate 28 to be selectively located so as to accommodate media bodies 34 of differing depths.

The front cover plate 30 also has an inturned edge 44 which engages the upstream side 46 of the body 34 adjacent its top 39. The front cover plate 30 may be held in place by, for example, removable threaded fasteners shown schematically at 48 that extend through the side panels 16 into tabs 50 struck from the main body of the plate 30 to be parallel to the side panels 16.

Figure 3:
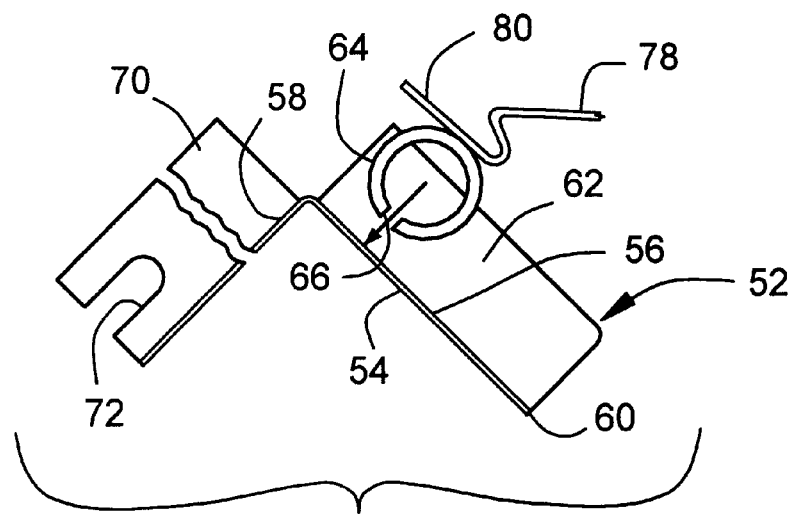
FIG. 3 is an enlarged, fragmentary view of a removable water distribution plate and header construction used in the invention.

Located between the cover plates 28 and 30 is a distributor/header assembly, generally designated 52. The distributor/header assembly 52 is illustrated in FIG. 3 and is seen to include an inverted, V-shaped distributor plate 54 having an upstream leg 56 and a downstream leg 58. The upstream leg 56 terminates in an edge 60 which is directed toward the inlet or entrance 18 to the housing 10. In addition, at its ends, the upstream leg 56 includes tabs 62, only one of which is shown.

Extending between the tabs 62 is a conduit 64, preferably formed of PVC, or the like. The conduit 64 acts as a manifold and is connected to a supply of water to be evaporated by a flexible hose (not shown). Along its length, the conduit 64 includes a plurality of apertures 66 which are directed toward the upstream leg 56 in a direction normal thereto. The apertures 66, in one embodiment, have diameters in the range of 0.161 inch to 0.250 inch and preferably a diameter of 0.191 inch. In addition, the apertures 66 are spaced on centers that are in the range of 1.0 inch to 2.5 inch. Preferably, a 2.0 inch of spacing between centers of the apertures 66 is employed in a highly preferred embodiment. At water flow rates in the range of 1.5 to 7.0 gallons per minute (GPM), the resulting water streams merge on the upstream leg 56 to form a nominally uniform sheet of water thereon at the edge 60. This provides for uniform wetting of the media body 34 at its upstream side 46 which in turn enhances efficiency.

The downstream leg 58 also includes tabs 70 at its ends. The lower ends of the tabs 70 include open slots 72 and pivot pins 74 extending inwardly from the side panels 16 that are removably received in the slots 72. The pivot pins 74 define a pivot axis that extends across the housing 10 perpendicular to the air flow 32 at a location just above the top 39 of the media body 34 and rearwardly, or downstream, of the edge 60. If desired, the pins 74 could be replaced by an elongated rod.

The front cover plate 30 mounts a pair of spaced leaf springs 78. As best seen in FIG. 3, each leaf spring terminates in an extended flat section 80 which engages the conduit 64 defining the manifold oppositely of the apertures 66 therein. It thus provides a biasing force about the pivot axis defined by the pivot pins 74 to cause the edge 60 of the upstream leg 56 of the distributor plate 54 to be biased into engagement with the upper surface 39 of the media body 34 at a location closely adjacent to or at the front cover plate 30. Alternatively, biasing weights may be utilized.

Figure 4:
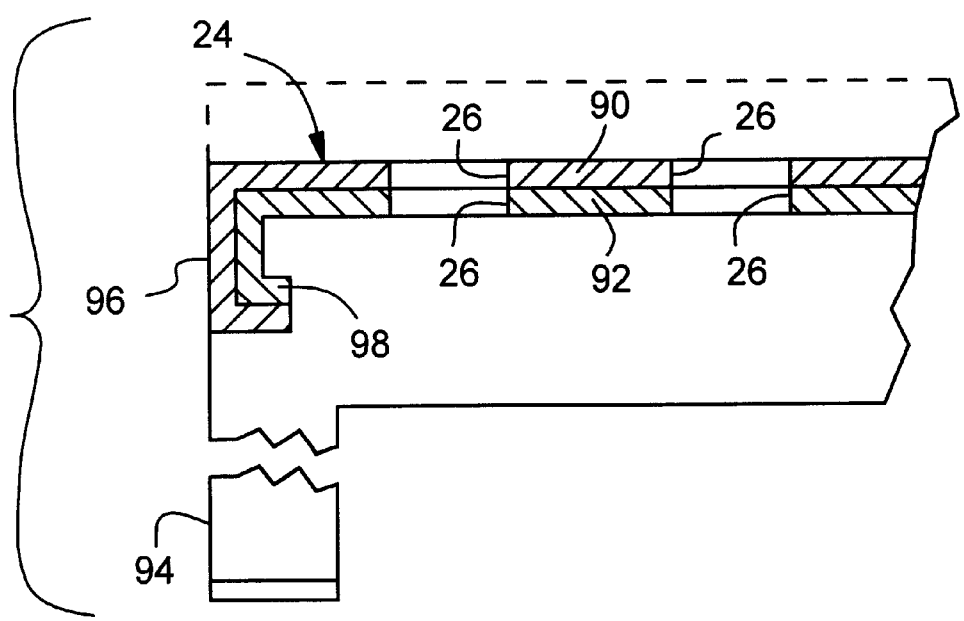
FIG. 4 is an enlarged, fragmentary vertical section of a media support.

Turning now to FIG. 4, the media support 24 will be described in greater detail. More specifically, the media support 24 includes first and second telescoping elements 90 and 92. At each of the four corners of the media support 24, one or the other of the two elements 90 and 92 is provided with a depending leg 94 which supports the media support 24 within the basin 22. On both sides, each of the elements 90, 92 is provided with a channel-like configuration 96, 98 which mate with one another to provide a sliding connection. Thus, the two elements 90 and 92 may telescope within one another to adjust the width of the media support 24 to accommodate varying depths of the media body 34. In addition, at the upstream side of the element 90, a pilot surface 100 is provided. A similar pilot surface 102 is provided at the downstream end of the element 92. The pilot surfaces 100, 102 serve to properly position the lower end of the media body 34 when it is introduced into the media support 24, and they direct any excess unevaporated liquid water flowing from the media back into the basin 22 via the slots 26 in the media support 24.

Operation of the cooler is as follows. Water at relatively low pressure is introduced into the conduit or header 64 and exits the same via the apertures 66 in a direction toward the upstream leg 56 of the distributor plate 54. In this connection, it is noted that the header 64 is located fairly closely to the apex of the water distribution plates 54. The spacing of the holes or apertures 66 and their diameters is such that a plurality of streams of water are introduced onto the upstream leg 56 in such a way that they merge without a great deal of overlap or intermixing to form a substantially uniform sheet of water by the time the water descends to the edge 60. As the edge 60 is in contact with the media body 34 near the forward or upstream side 46 of the body 34, water to be evaporated is delivered to the very front of the body 34. As a consequence, the front of the body 34 is uniformly wetted. The air flow through the body 34 carries the water rearwardly through the body 34 and because the entire body 34 is wetted from front to back, contact time between the air stream and the water to be evaporated is maximized to promote efficient evaporation. Moreover, because the full depth of the body 34 is employed, the air velocity may be increased over those customarily used without having carry-over of water from the downstream side 38 of the media body 34. Table 1 below illustrates air flow in feet per minute and the advertised effectiveness of commercially available evaporative cooling media available from Munters as mentioned previously and Cooltex at those air flows. It will be particularly noted that Munters advertises its maximum air flow velocity at about 805 ft. per minute where Cooltex advertises its maximum air flow at about 692 ft. per minute.

Table 1 also illustrates the air flow velocities that are achievable with an evaporative cooler made according to the invention and the effectiveness at those air flows.

TABLE 1

MUNTERS AND COOLTEX CATALOG PERFORMANCE vs. INVENTION'S ACTUAL PERFORMANCE EVAPORATIVE COOLERS WITHOUT WATER CARRY-OVER
Cataloged Effectiveness (%)

| FPM | Munters | Cooltex | Invention Actual Munters | Invention Actual Cooltex |
| --- | --- | --- | --- | --- |
| 610 | 88.50 | 88.70 | | 87.80 |
| 658 | 88.25 | 88.60 | | 95.40 |
| 692 | 87.90 | 88.30 | | 92.30 |
| 727 | 87.50 | | 84.70 | 88.90 |
| 805 | 87.00 | | 90.70 | 90.60 |
| 873 | | | 85.10 | 92.20 |
| 935 | | | 91.00 | 93.50 |
| 1047 | | | | 92.30 |
| Averages = | 87.83 | 88.53 | 87.88 | 91.63 |

As can be readily appreciated from Table 1 above, substantially higher velocities of air flow can be achieved without carry-over and therefore smaller media surface areas can be used per a given volumetric flow rate of air throughput without reducing the effectiveness of the cooling system. Consequently, it will be appreciated that a highly efficient evaporative cooling system is provided.

The inventive evaporative cooler is easily serviced as well. When the media 34 requires changing, it is only necessary to remove the threaded fasteners 48 on both sides of the cooler and remove front cover plate 30. The springs 78, are of course, attached to the cover plate as mentioned previously and are removed at the same time as the cover plate 30. It is then only necessary to lift the distributor/header assembly 52 such that the slots 72 on the downstream leg 58 clear the pivot pins 74. This allows the distributor/header assembly 52 to be removed from the housing 10 as well. At this point, it is only necessary to tip the upper end 39 of the media body 34 in the direction of the air entrance 18 and remove the same from the housing 10. A new media body may then be inserted by reversing the procedure and using the pilot surfaces 100, 102. The distributor/header assembly 52 is easily reinstalled simply by causing the pivot pins 74 to enter the slots 72 and then reinstalling the front cover plate 30. It is to be particularly noted that the extended flat surfaces 80 on the springs 78 provide a self-alignment function when the front cover plate 30 is reinstalled. Thus, servicing the evaporative cooler is considerably simplified.

We claim:

1. An evaporative cooler, comprising:
   a housing having an air entrance, an air exit and a substantially closed air flow path extending between the entrance and the exit;
   a body of evaporative cooling media within said housing and extending across said air path, said body having an upper end and upstream and downstream sides in the direction of air flow between said entrance and said exit;
   a water distribution plate above said body and having an elongated edge contacting said body along the entire length of said edge at a location at or closely adjacent said upstream side;

a biasing device biasing said edge against said body; and a water distribution header overlying said water distribution plate for directing water onto said plate.

2. The evaporative cooler of claim 1 wherein said header includes a plurality of spaced water outlet ports directed toward said plate to generate a plurality of water streams, said streams merging with one another on said plate to provide a nominally uniform sheet of water on said plate at said edge.

3. The evaporative cooler of claim 1 wherein said header is mounted to said plate and said biasing device includes a spring engaging said header.

4. The evaporative cooler of claim 1 wherein said distribution plate is hinged about an axis generally parallel to said edge and spaced therefrom.

5. The evaporative cooler of claim 1 wherein said edge is directed toward said upstream side.

6. The evaporative cooler of claim 1 wherein said water distribution plate mounts said water distribution header and includes spaced, slotted, mounting elements spaced from said edge, and at least one pivot defining a pivot axis spaced from said edge and removably receiving said slotted mounting elements to pivotally and removably mount said water distribution plate and said header within said housing.

7. An evaporative cooler, comprising:

a housing having an air entrance and an opposite air exit;

a lower, water collecting basin extending across and within said housing between said entrance and said exit;

an upper, back cover plate within said housing and extending toward said basin;

an upper front cover plate within said housing and extending toward said basin and spaced from said back cover plate in the direction of said entrance;

a media support within said housing just above said basin and adapted to support a body of evaporative cooling media within said housing with an upper end of the body disposed between and engaging said cover plates;

a pivot between said cover plates defining a generally horizontal pivot axis across the interior of said housing;

a water distribution plate between said cover plates and to the entrance side of said pivot axis;

a water distribution header secured to said water distribution plate;

mounting elements having open slots and secured to said water distribution plate, said slots removably receiving said pivot; and at least one spring mounted on said front cover plate and engaging one of said header and said water distribution plate to urge said water distribution plate into engagement with a body of evaporative cooling media on said support.

8. The evaporative cooler of claim 7 wherein said water distribution plate has an edge facing said entrance for engaging said body, said edge being closely adjacent to said front cover plate, said pivot being between said edge and said back cover plate.

9. The evaporative cooler of claim 7 wherein said spring is a leaf spring and has an extended flat surface for engaging said one of said header and said water distribution plate.

10. The evaporative cooler of claim 7 wherein said housing includes a plurality of mounting devices for mounting one of said cover plates at any one of a series of desired locations within said housing.

11. The evaporative cooler of claim 10 wherein said media support is formed of two telescoping apertured or slotted elements so as to be adjustable to receive media of varying dimensions as measured in the direction between said entrance and said outlet.

12. The evaporative cooler of claim 7 wherein said water distribution plate is an inverted, V-shaped plate having an upstream leg and a downstream leg, said upstream leg terminating in an edge closely adjacent said front cover plate, both of said legs having tabs at each end, the tabs on said upstream leg mounting said header, the tabs on said downstream leg constituting said mounting elements.

* * * * *